(12) United States Patent
Ito et al.

(10) Patent No.: US 11,092,108 B2
(45) Date of Patent: Aug. 17, 2021

(54) CONTROL DEVICE FOR COMPRESSION SELF-IGNITION ENGINE

(71) Applicant: Mazda Motor Corporation, Hiroshima (JP)

(72) Inventors: Naoya Ito, Aki-gun (JP); Takashi Kaminaga, Aki-gun (JP); Kenji Uchida, Aki-gun (JP); Tatsuya Fujikawa, Aki-gun (JP); Takashi Youso, Aki-gun (JP); Masahisa Yamakawa, Aki-gun (JP); Mitsuhiro Muto, Aki-gun (JP); Takuma Fujii, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/074,330

(22) Filed: Oct. 19, 2020

(65) Prior Publication Data

US 2021/0172397 A1 Jun. 10, 2021

(30) Foreign Application Priority Data

Dec. 6, 2019 (JP) .............................. JP2019-221078

(51) Int. Cl.
    *F02D 41/40* (2006.01)
    *F02D 35/02* (2006.01)
    *F02D 41/30* (2006.01)

(52) U.S. Cl.
    CPC ........... *F02D 41/402* (2013.01); *F02D 35/02* (2013.01); *F02D 41/3017* (2013.01); *F02D 2200/022* (2013.01)

(58) Field of Classification Search
    CPC .... F02D 41/402; F02D 41/3017; F02D 35/02; F02D 2200/022
    See application file for complete search history.

(56) References Cited

U.S. PATENT DOCUMENTS 7,284,506 B1 * 10/2007 Sun ........................ F02M 43/00
                                                          123/1 A
2002/0000209 A1 * 1/2002 Ando ........................ F02B 3/12
                                                          123/21

(Continued)

FOREIGN PATENT DOCUMENTS

JP       2002155780 A * 5/2002 ......... F02D 41/3041
JP       2012241589 A   12/2012

*Primary Examiner* — Joseph J Dallo
(74) *Attorney, Agent, or Firm* — Alleman Hall Creasman & Tuttle LLP

(57) ABSTRACT

A control device for a compression self-ignition engine includes a fuel injection system and an injection controller. While the engine is operated by CI combustion under a given first condition, a first injection is carried out in which fuel is injected at a first timing in a compression stroke and at which the fuel goes toward a part radially outward of a cavity formed in a crown surface of a piston, and a second injection is suspended. While the engine is operated by the CI combustion under a second condition in which a temperature inside a combustion chamber at a close timing of an intake valve becomes lower than the first condition, at least the second injection is carried out in which the fuel is injected at a second timing later than the first timing in the compression stroke and at which the fuel goes toward the cavity.

10 Claims, 9 Drawing Sheets

(56) References Cited

U.S. PATENT DOCUMENTS

| | | | |
|---|---|---|---|
| 2003/0217733 A1* | 11/2003 | Shiraishi | F02D 41/3047 123/295 |
| 2012/0216774 A1* | 8/2012 | Oba | F02M 63/0225 123/305 |
| 2012/0216775 A1* | 8/2012 | Iwai | F02D 41/402 123/305 |
| 2012/0216776 A1* | 8/2012 | Nagatsu | F02D 13/0234 123/305 |
| 2017/0089273 A1* | 3/2017 | Thomas | F02D 35/027 |

* cited by examiner

CONTROL DEVICE FOR COMPRESSION SELF-IGNITION ENGINE

TECHNICAL FIELD

The present disclosure relates to a control device for a compression self-ignition engine which includes a combustion chamber defined by a cylinder and a piston fitted in the cylinder, an intake valve which opens and closes an intake port to introduce intake air into the combustion chamber, and a control device which causes the engine to perform compression self-ignition (CI) combustion in which a mixture gas of fuel and air combusts by self-ignition inside the combustion chamber at least in a part of an operating range of the engine.

BACKGROUND OF THE DISCLOSURE

For engines mounted on automobiles, it has been considered to perform compression self-ignition combustion (CI combustion), instead of a combustion mode in which a spark plug forcibly ignites a mixture gas by jump-spark ignition. The compression self-ignition combustion is a combustion mode in which the mixture gas formed inside a combustion chamber (inside a cylinder) is compressed by a piston so that the mixture gas becomes high in temperature and pressure to combust by self-ignition, not by the jump-spark ignition. The compression self-ignition combustion is believed to provide higher thermal efficiency, because concurrent self-ignition of the mixture gas at multiple locations of the combustion chamber reduces the combustion duration as compared to the combustion by the jump-spark ignition. However, the compression self-ignition combustion has the problem of a tendency of increasing combustion noise, because the self-ignition of the mixture gas in various areas causes a rapid increase in the in-cylinder pressure.

As an engine to which the compression self-ignition combustion is applied, for example, JP2012-241589A discloses an engine in which fuel is injected into a combustion chamber at two separate timings (split injection) during a compression stroke and the mixture gas is caused to combust by self-ignition. In detail, according to the engine disclosed in JP2012-241589A, a first fuel injection injects fuel to a radially-outward part of the combustion chamber, and a second fuel injection injects fuel into a cavity formed in a crown surface of a piston. This engine seeks to disperse the fuel inside the combustion chamber to avoid a concurrent start of combustion of all the fuel, thereby preventing the increase in combustion noise.

However, even the configuration of JP2012-241589A may not fully reduce the combustion noise. In detail, according to the configuration of JP2012-241589A, the fuel is injected into the cavity at a timing near a compression top dead center, even when the combustion chamber is under a condition where the mixture gas is easily combustible. That is, in the condition of the combustion chamber where the mixture is already easy to combust, the fuel is further injected into the hot cavity. Thus, a rich mixture gas (with a high fuel ratio) formed in the cavity rapidly combusts, and this combustion causes a sudden increase in the temperature inside the combustion chamber, which further causes the mixture gas around the cavity to combust early. As a result, the in-cylinder pressure may rise rapidly.

SUMMARY OF THE DISCLOSURE

The present disclosure is made in view of the above situations, and one purpose thereof is to provide a control device for a compression self-ignition engine, which can suitably perform compression self-ignition combustion while more reliably reducing an increase in combustion noise.

According to one aspect of the present disclosure, a control device for a compression self-ignition engine is provided. The engine includes a cylinder, a piston fitted in the cylinder and having a concave cavity formed in a crown surface thereof, and an intake valve configured to open and close an intake port configured to introduce intake air into a combustion chamber defined by the cylinder and the piston, and the engine is configured to execute compression self-ignition (CI) combustion in which a mixture gas of fuel and air combusts inside the combustion chamber by self-ignition. The control device includes a fuel injection system configured to inject fuel from a ceiling surface of the combustion chamber into the combustion chamber, and an injection controller configured to cause the fuel injection system to carry out a first injection to inject fuel at a first timing in a compression stroke, and a second injection to inject fuel at a second timing later than the first timing in the compression stroke, while executing the CI combustion. The first timing is set at a timing when the fuel injected from the fuel injection system goes toward a part radially outward of the cavity, and the second timing is set at a timing when the fuel injected from the fuel injection system goes toward the cavity. While the engine is operated by the CI combustion under a given first condition, the injection controller causes the fuel injection system to carry out the first injection and suspend the second injection. While the engine is operated by the CI combustion under a second condition in which a temperature inside the combustion chamber at a close timing of the intake valve becomes lower than the temperature under the first condition, the injection controller causes the fuel injection system to carry out at least the second injection.

According to this configuration, under the first condition in which the temperature inside the combustion chamber at the close timing of the intake valve is high (i.e., under the condition where the temperature inside the combustion chamber near a compression top dead center becomes high and the mixture gas easily combusts), the first injection is carried out in which the fuel is injected at the first timing at which the fuel goes toward the part radially outward of the cavity. Thus, the temperature at the radially-outward part of the combustion chamber, which is the part where the temperature becomes low easier than the center part of the combustion chamber, is further lowered by the latent heat of vaporization of the fuel in the first injection. As a result, near the compression top dead center, the temperature inside the combustion chamber is unevenly distributed, which prevents that all the mixture gas inside the combustion chamber combusts concurrently. In addition, under the first condition, the second injection in which the fuel is injected at the second timing at which the fuel goes toward the cavity, is suspended. Thus, it can be prevented that a rich mixture gas is formed in the cavity at high temperature, and this rich mixture gas and the mixture gas inside the combustion chamber rapidly combust. As a result, the pressure inside the combustion chamber is prevented from rising rapidly and the increase in combustion noise can be reduced.

Moreover, under the second condition in which the temperature inside the combustion chamber at the close timing of the intake valve is low and accordingly the mixture gas is comparatively difficult to combust, the second injection is carried out and the rich mixture gas is formed inside the cavity at the comparatively high temperature at the timing nearer to the compression top dead center. Thus, this rich mixture gas and the mixture gas inside the combustion chamber can surely carry out self-ignition.

Therefore, according to this configuration, the increase in combustion noise is reduced securely and proper compression self-ignition combustion (CI combustion) can be achieved.

While the CI combustion is performed, the injection controller may estimates the temperature inside the combustion chamber at the close timing of the intake valve, and determine a ratio of a first injection amount that is an amount of fuel injected at the first timing and a ratio of a second injection amount that is an amount of fuel injected at the second timing based on an intake valve close timing (IVC) estimated in-cylinder temperature that is the estimated temperature inside the combustion chamber.

According to this configuration, since the ratios of the first injection amount and the second injection amount are determined according to the temperature of the combustion chamber at the close timing of the intake valve (i.e., according to the combustibility of the mixture gas), the combustion is prevented from occurring excessively early or excessively late, and thus, the proper compression self-ignition combustion (CI combustion) can be carried out more securely.

While the CI combustion is performed, the injection controller may determine the first timing and the second timing based on the IVC estimated in-cylinder temperature.

According to this configuration, the first injection and the second injection are carried out at suitable timings according to the temperature of the combustion chamber at the close timing of the intake valve (i.e., according to the combustibility of the mixture gas) and, thus, the proper compression self-ignition combustion (CI combustion) can be carried out furthermore securely.

While the CI combustion is performed, the injection controller may estimate a combustion center-of-gravity timing based on the IVC estimated in-cylinder temperature so that the combustion center-of-gravity timing becomes earlier as the IVC estimated in-cylinder temperature increases. The injection controller may determine the first injection amount and the second injection amount so that the ratio of the second injection amount to the sum of the first injection amount and the second injection amount becomes larger as the estimated combustion center-of-gravity timing is later. The injection controller may determine the first timing so that the first timing becomes earlier as the estimated combustion center-of-gravity timing is later, and determine the second timing so that the second timing becomes later as the estimated combustion center-of-gravity timing is later.

When the temperature of the combustion chamber at the close timing of the intake valve is high, the temperature of the mixture gas near the compression top dead center becomes high easily, and the combustion center-of-gravity timing becomes earlier. Accordingly, in this configuration, the combustion center-of-gravity timing is estimated based on the IVC estimated in-cylinder temperature so that the combustion center-of-gravity timing becomes earlier as the IVC estimated in-cylinder temperature increases. Thus, the combustion center-of-gravity timing is estimated properly. Further, according to this configuration, by changing the ratios of the first injection amount and the second injection amount, and the first timing and the second timing based on the estimated combustion center-of-gravity timing, the combustion center-of-gravity timing can be set more suitably and the more proper compression self-ignition combustion can be carried out.

Here, the present inventors obtained the knowledge that the combustion center-of-gravity timing becomes earlier as the ratio of the second injection amount to the sum of the first injection amount and the second injection amount is larger, the knowledge that the combustion center-of-gravity timing becomes later as the first timing is later, and the knowledge that the combustion center-of-gravity timing becomes later as the second timing is earlier. Accordingly, in this configuration, the ratio described above and the first and second timings are determined based on the estimated combustion center-of-gravity timing as described above, therefore, the combustion center-of-gravity timing can suitably be set more securely.

While the CI combustion is performed, the injection controller may cause the fuel injection system to carry out an intake-stroke injection to inject fuel in an intake stroke.

According to this configuration, mixing of a part of the fuel injected in the intake stroke with air can be stimulated to prevent the increase in soot more securely.

DETAILED DESCRIPTION OF THE DISCLOSURE (1) Overall Configuration of Engine

Figure 1:
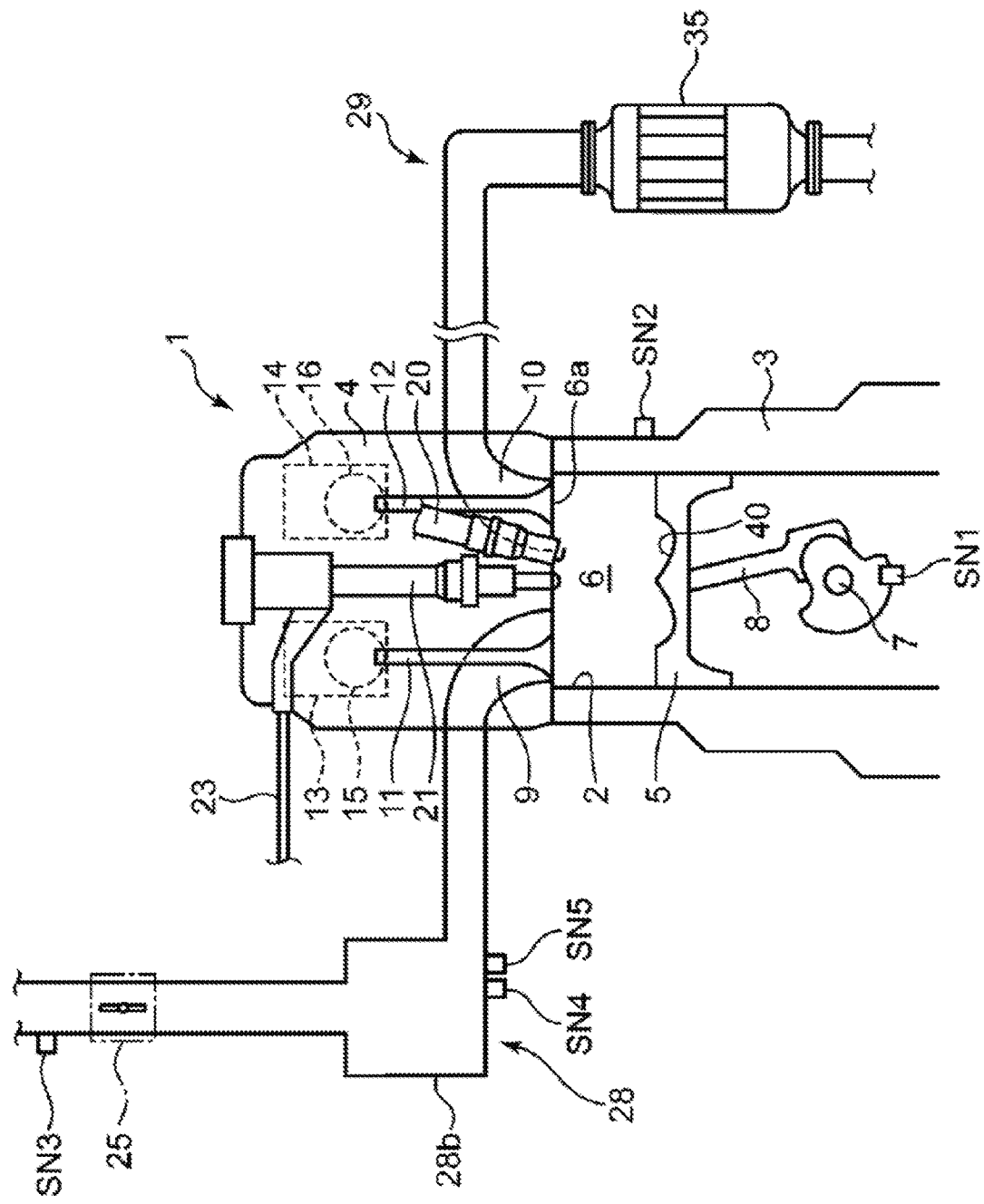
FIG. 1 is a view illustrating the entire configuration of a compression self-ignition engine according to one embodiment of the present disclosure.

FIG. 1 is a view illustrating the overall configuration of a compression self-ignition engine to which a control device for the compression self-ignition engine according to one embodiment of the present disclosure is applied. Below, the compression self-ignition engine is simply referred to as the "engine." The engine illustrated in this figure is a four-cycle engine mounted on a vehicle as a power source for propelling the vehicle. The engine includes an engine body 1, an intake passage 28 where intake air introduced into the engine body 1 circulates, and an exhaust passage 29 where exhaust gas discharged from the engine body 1 circulates.

The engine body 1 includes a cylinder block 3 where the cylinder 2 is formed therein, a cylinder head 4 attached to an upper surface of the cylinder block 3 to cover the cylinder 2 from above, and a piston 5 reciprocatably fitted in the cylinder 2. Although the engine body 1 is typically a multiple cylinder type having a plurality of cylinders (e.g., four cylinders line up in a direction perpendicular to the drawing sheet of FIG. 1), only one cylinder 2 is described herein for simplifying the description.

Above the piston 5, a combustion chamber 6 is defined by the piston 5 and the cylinder 2. Fuel is supplied to the combustion chamber 6 by an injection from an injector 21 (described later). The supplied fuel is mixed with air and combusts inside the combustion chamber 6, and an expansion force caused by the combustion depresses the piston 5, thereby the piston 5 reciprocating in the up-and-down direction. Below the piston 5, a crankshaft 7 which is an output shaft of the engine body 1 is provided. The crankshaft 7 is coupled to the piston 5 via a connecting rod 8, and it is rotated on the center axis by the reciprocating motion (vertical motion) of the piston 5. In this embodiment, the engine is a gasoline engine which mainly uses gasoline as fuel, and fuel which contains only gasoline, or contains a secondary component, such as bioethanol, in addition to gasoline, is supplied to the engine body 1.

A concave cavity 40 is formed in a center part of a crown surface 5a of the piston 5. The cavity 40 is dented downwardly (the opposite side from the cylinder head 4). In this embodiment, a bottom surface of the cavity 40 is formed in a gentle mountain shape, and has a peak part in a radial center part of the crown surface 5a of the piston 5 and the cavity 40. An inner circumferential part of the bottom surface of the cavity 40 is formed so that its height is gradually lowered to the radially outside from the radially-central peak part, and the height is again gradually raised to the radially outside in a radially-outward part.

An intake port 9 for supplying intake air to the combustion chamber 6 and an exhaust port 10 for discharging exhaust gas inside the combustion chamber 6 are formed in the cylinder head 4. The intake port 9 and the exhaust port 10 open to the combustion chamber 6. The cylinder head 4 is provided with an intake valve 11 which opens and closes the intake port 9, and an exhaust valve 12 which opens and closes the exhaust port 10. Note that the valve type of the engine of this embodiment is 4-valve type comprised of two intake valves and two exhaust valves, where two intake ports 9, two exhaust ports 10, two intake valves 11, and two exhaust valves 12 are provided to each cylinder 2.

The intake valve 11 and the exhaust valve 12 are interlocked with the rotation of the crankshaft 7 through valve operating mechanisms 13 and 14 which includes a pair of cam shafts disposed inside the cylinder head 4 and opens and closes the valves 11 and 12, respectively.

An intake-valve variable mechanism 15 which can change at least an open timing of the intake valve 11 is built in the valve operating mechanism 13 for the intake valve 11. Similarly, an exhaust-valve variable mechanism 16 which can change at least a close timing of the exhaust valve 12 is built in the valve operating mechanism 14 for the exhaust valve 12. By controlling the intake-valve variable mechanism 15 and the exhaust-valve variable mechanism 16, a valve overlap period where both the intake valve 11 and the exhaust valve 12 open can be changed. In addition, by changing the valve overlap period, an amount of burnt gas (internal exhaust gas recirculation (EGR) gas) which remains inside the combustion chamber 6 is changed. Note that the intake-valve variable mechanism 15 (or the exhaust-valve variable mechanism 16) may be a variable mechanism which changes only the close timing (or the open timing) while the open timing (or the close timing) of the intake valve 11 (or the exhaust valve 12) is fixed, or may be a phase-type variable mechanism which simultaneously changes the open timing and the close timing of the intake valve 11 (or the exhaust valve 12).

The cylinder head 4 is provided with a set of the injector 21 which injects fuel (mainly gasoline) into the combustion chamber 6, and an ignition plug 20 which ignites a mixture gas of fuel injected into the combustion chamber 6 from the injector 21 and air introduced into the combustion chamber 6, per cylinder 2.

The injector 21 is a multiple nozzle hole type which has a plurality of nozzle holes at a tip-end part thereof. The injector 21 is provided to a center part of a ceiling surface 6a (a lower surface of the cylinder head 4 which covers the combustion chamber 6) of the combustion chamber 6 so that its tip-end part opposes to the part which constitutes the peak part described above of the center part of the crown surface 5a of the piston 5 and of the center part of the cavity 40. Fuel is injected radially from the nozzle holes of the injector 21. In detail, each nozzle hole of the injector 21 is formed so that its opening end is oriented obliquely downward, and outward in the bore radial direction, and therefore, the fuel injected from each nozzle hole is radially injected so that it spreads outside in the bore radial direction as it approaches the crown surface 5a of the piston 5. The injector 21 is connected to a fuel feed pipe 23, and fuel supplied through the fuel feed pipe 23 is injected from the tip-end part of the injector 21. This injector 21 is an example of a "fuel injection system" in the present disclosure.

The ignition plug 20 is provided at a position deviated slightly from the injector 21 so that it faces the inside of the combustion chamber 6 from the ceiling surface 6a of the combustion chamber 6.

The intake passage 28 is connected to one side surface of the cylinder head 4 so as to communicate with the intake port 9. Air (fresh air) taken in from an upstream end of the intake passage 28 is introduced into the combustion chamber 6 through the intake passage 28 and the intake port 9. The intake passage 28 is provided with a throttle valve 25 and a surge tank 28b, sequentially in this order from upstream. The throttle valve 25 opens and closes the intake passage 28 to adjust an amount of air which passes through the intake passage 28.

The exhaust passage 29 is connected to the other side surface of the cylinder head 4 so as to communicate with the exhaust port 10. Burnt gas (exhaust gas) generated in the combustion chamber 6 is discharged outside through the exhaust port 10 and the exhaust passage 29. The exhaust passage 29 is provided with a catalytic converter 35 which purifies exhaust gas. For example, a three-way catalyst is built in the catalytic converter 35.

The cylinder block 3 is provided with a crank angle sensor SN1 which detects a rotational angle of the crankshaft 7 (i.e., an engine speed). A water jacket (not illustrated) where coolant circulates is formed inside the cylinder block 3 and the cylinder head 4 of the engine body 1, and the cylinder block 3 is also provided with a water temperature sensor SN2 which detects a temperature of the coolant inside the water jacket.

An air flow sensor SN3 which detects an intake air amount which is an amount of air introduced into the cylinder 2, and an intake pressure sensor SN5 which detects an intake pressure which is a pressure of the air introduced into the cylinder 2 are disposed in the intake passage 28. The air flow sensor SN3 is disposed downstream of an air cleaner 31, and it detects a flow rate of air passing through this part. The intake pressure sensor SN5 is disposed at the surge tank 28b, and it detects a pressure of intake air passing through the surge tank 28b.

(2) Control System

Figure 2:
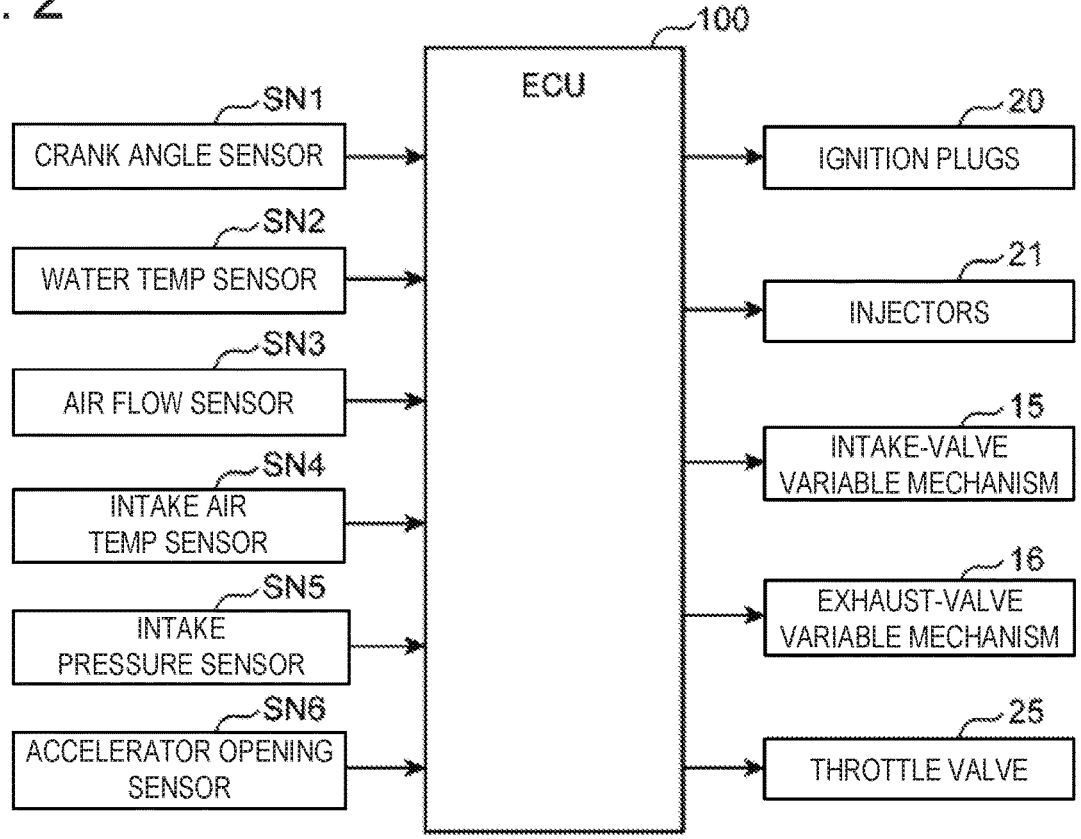
FIG. 2 is a block diagram illustrating a control system of the engine.

FIG. 2 is a block diagram illustrating a control system of the engine. An electronic control unit (ECU) 100 illustrated in this figure is a control device comprised of a microcomputer for comprehensively controlling the engine, and is comprised of a processor (e.g., central processing unit (CPU)), ROM, RAM, etc., which are well known. The ECU 100 is configured to control the injector 21 as will be described later, and it is an example of an "injection controller" in the present disclosure.

Detected information by the various sensors are inputted into the ECU 100. For example, the ECU 100 is electrically connected to the crank angle sensor SN1, the water temperature sensor SN2, the air flow sensor SN3, an intake air temperature sensor SN4, and the intake pressure sensor SN5. The information detected by these sensors SN1 to SN5 (i.e., the information, such as the engine speed, the engine water temperature, the intake air amount, the intake air temperature, and the intake pressure) are sequentially inputted into the ECU 100. Moreover, an accelerator opening sensor SN6 is provided to the vehicle, which detects an accelerator opening which is an opening of an accelerator pedal operated by a driver operating the vehicle. The detected information by the accelerator opening sensor SN6 is also sequentially inputted into the ECU 100.

The ECU 100 controls each part of the engine, while performing various determinations and calculations based on the information inputted from the sensors SN1 to SN6. That is, the ECU 100 is electrically connected with the injector 21, the ignition plug 20, the throttle valve 25, the intake valve 11 (the intake-side valve operating mechanism 13), and the exhaust valve 12 (the exhaust-side valve operating mechanism 14), and outputs control signals to these components based on the results of the determinations and calculations.

Figure 3:
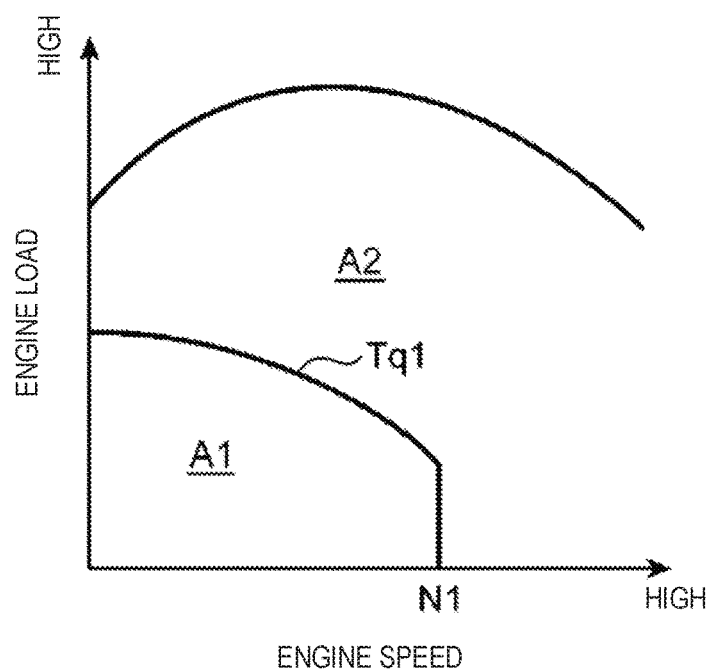
FIG. 3 is a view illustrating one example of a control map of the engine.

FIG. 3 is a map illustrating a difference in the control according to the engine speed and the engine load. As illustrated in this figure, an operating range of the engine is roughly divided into two sub ranges (i.e., a first range A1 and a second range A2).

The first range A1 is a low-speed low-load range where the engine speed is a given switching engine speed N1 or lower and the engine load is a given switching load Tq1 or lower. The second range A2 is the remaining range other than the first range A1. Note that the switching load Tq1 is set so as to become lower as the engine speed increases.

(2-1) First Range

The content of the control executed by the ECU 100 in the first range A1 is described. In the first range A1, CI (Compression Ignition) combustion in which the mixture gas of fuel and air combusts inside the combustion chamber 6 by self-ignition is performed. That is, the mixture gas combusts only by a compression of the piston 5, without igniting the fuel by the ignition plug 20. Thus, the ignition plug 20 is stopped in the first range A1.

Figure 4:
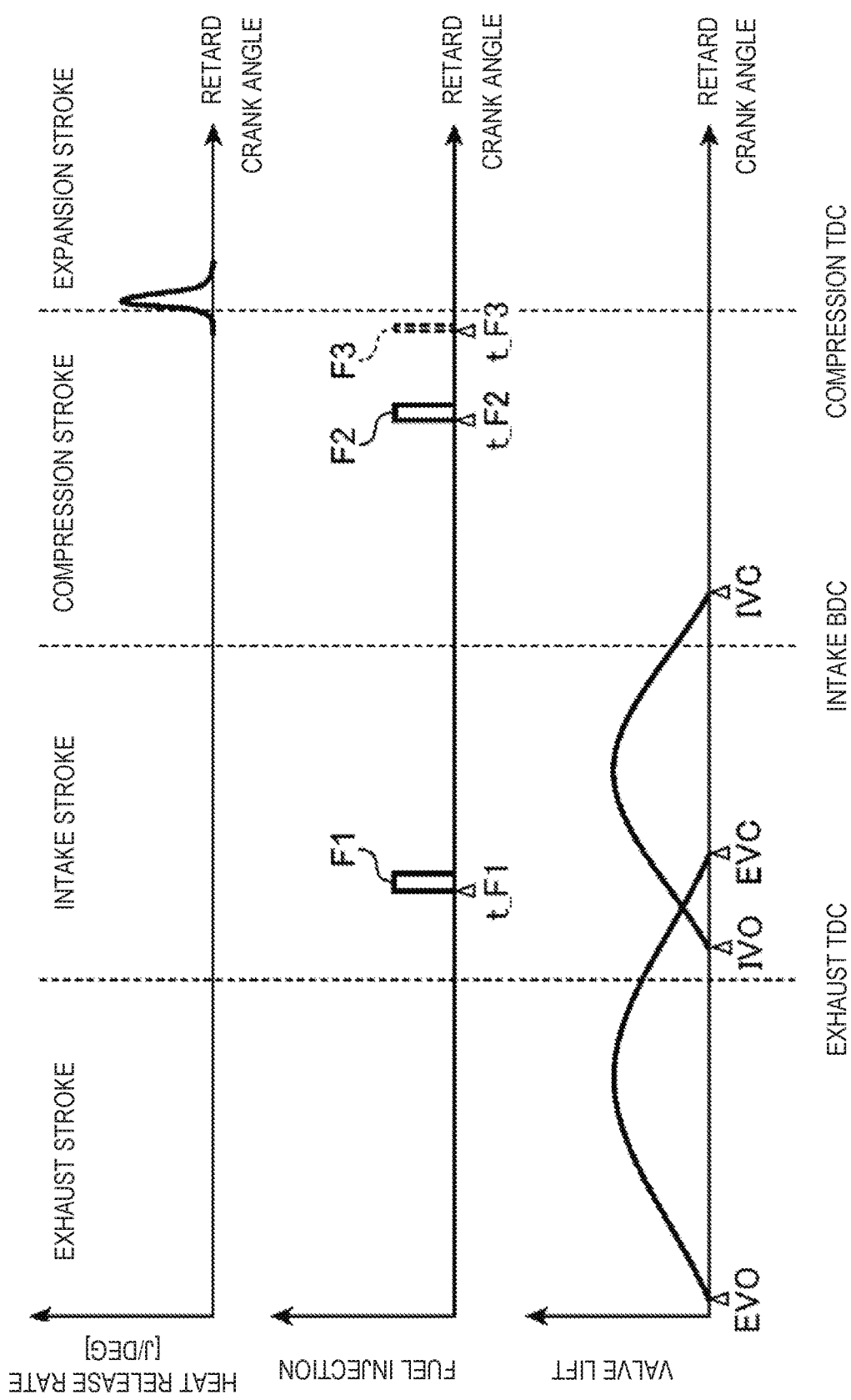
FIG. 4 is a time chart illustrating the contents of a control in a first range.

FIG. 4 is a view illustrating a fuel injection timing (a timing at which fuel is injected from the injector 21), lift characteristics of the intake valve 11 and the exhaust valve 12, and a heat release rate (J/deg) to be generated, when the engine is operated at a representative operating point in the first range A1.

As illustrated in FIG. 4, in the first range A1, the exhaust valve 12 is opened also during an intake stroke, and exhaust gas once discharged to the exhaust port 10 from the combustion chamber 6 is again introduced back into the combustion chamber 6. That is, in the first range A1, internal EGR in which burnt gas remains inside the combustion chamber 6 is carried out. In this embodiment, a close timing of the exhaust valve 12 (EVC) is retarded from an exhaust top dead center so that the exhaust valve 12 is opened across the exhaust top dead center. Note that the opening and closing operation of the exhaust valve 12 for carrying out the internal EGR may be, but not limited to be, one in which the exhaust valve 12 is opened twice by being opened again in an intake stroke after the exhaust valve 12 is closed once near an exhaust top dead center. In addition, in the first range A1, the close timing of the exhaust valve 12 (EVC) is retarded from the open timing of the intake valve 11 (IVO) so that the valve overlap in which both the intake valve 11 and the exhaust valve 12 open during a given period of time is carried out.

In the first range A1, an intake-stroke injection F1 in which fuel is injected into the combustion chamber 6 from the injector 21 in an intake stroke, and a compression-stroke injection in which fuel is injected in a compression stroke are carried out. Here, fundamentally, as illustrated by a solid line in FIG. 4, the fuel injection is only performed once during the compression stroke, but in the first range A1, a fuel injection F3 illustrated by a broken line may further be performed during the compression stroke. That is, under a given condition in the first range A1, the intake-stroke injection F1, a first compression-stroke injection F2 in which fuel is injected in a compression stroke, and the second compression-stroke injection F3 in which fuel is injected at a timing in the compression stroke later than the first compression-stroke injection F2 are carried out. Thus, in this embodiment, the injector 21 is possible to inject fuel dividedly twice in the compression stroke.

Operation timing (start timing) of the intake-stroke injection F1 is in the first half of an intake stroke, for example, 60° CA (CA: crank angle) after an exhaust top dead center (i.e., about −300° CA before a compression top dead center).

Figure 5:
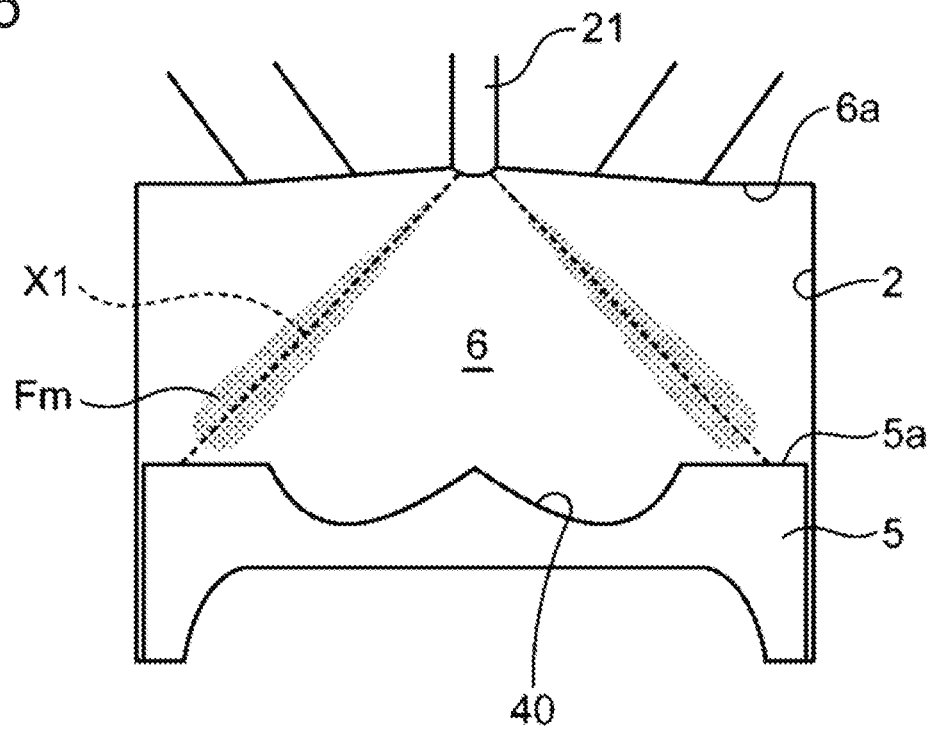
FIG. 5 is a view schematically illustrating a situation of a fuel spray by a first compression-stroke injection.

A first timing t_F2 which is an operation timing (start timing) of the first compression-stroke injection F2 is set at a timing when fuel injected by the first compression-stroke injection F2 from the injector 21 goes toward the part radially outward of the cavity 40. That is, the first timing t_F2 is set so that, as illustrated in FIG. 5, a line X1 along an axis of a fuel spray Fm of fuel injected from the injector 21 passes through the part radially outward of the cavity 40. For example, the operation timing of the first compression-stroke injection F2 is set at a timing of 180° CA to 90° CA before a compression top dead center. The first compression-stroke injection F2 is an example of a "first injection" in the present disclosure.

Figure 6:
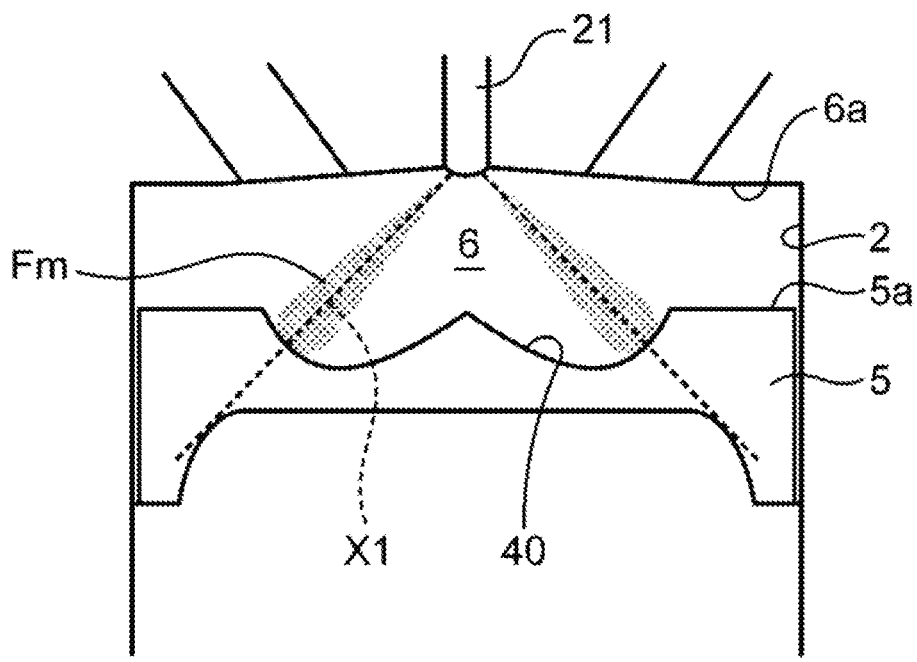
FIG. 6 is a view schematically illustrating a situation of a fuel spray by a second compression-stroke injection.

A second timing t_F3 which is the operation timing (start timing) of the second compression-stroke injection F3 is set at a timing when fuel injected by the second compression-stroke injection F3 from the injector 21 goes toward the cavity 40 in the piston 5. That is, the second timing t_F3 is set so that, as illustrated in FIG. 6, the line X1 along the axis of the fuel spray Fm of the fuel injected from the injector 21 intersects with the bottom surface of the cavity 40.

For example, the operation timing of the second compression-stroke injection F3 is set at a timing of 35° CA to 5° CA before a compression top dead center. The second compression-stroke injection F3 is an example of a "second injection" in the present disclosure.

The fuel is injected in the first range A1 dividedly by the intake-stroke injection F1 and the first compression-stroke injection F2 in order to control an increase in combustion noise while reducing generation of soot.

In detail, since a time to the compression top dead center is short when all the fuel is supplied to the combustion chamber 6 in the compression stroke, the combustion may occur without the fuel and air being fully mixed, thereby increasing the generating amount of soot. On the other hand, when all the fuel is supplied to the combustion chamber 6 in the intake stroke, a comparatively rich (fuel concentration is high) mixture gas is formed entirely in the combustion chamber 6. As a result, the mixture gas may carry out self-ignition simultaneously at multiple locations inside the combustion chamber 6 near the compression top dead center to abruptly increase an in-cylinder pressure (a pressure inside the combustion chamber), thereby increasing the combustion noise.

Therefore, in this embodiment, by dividing the fuel injection into the intake-stroke injection F1 and the first compression-stroke injection F2 as described above, mixing of a portion of the fuel with air is facilitated to reduce the generation of soot, while shifting the combustion start timing at multiple locations inside the combustion chamber 6 to prevent the increase in the combustion noise.

In particular, as described above, the first compression-stroke injection F2 is carried out so that fuel injected from the injector 21 goes toward the part radially outward of the cavity 40. Therefore, the increase in the combustion noise is effectively prevented.

In detail, the temperature at the radially-outward part of the combustion chamber 6 is kept lower than the temperature of the center part by radiation of heat from a wall surface of the combustion chamber 6. In this state, when fuel is injected to the radially-outward part of the cavity 40, the temperature at the radially-outward part is further lowered than the temperature of the cavity 40 by latent heat of vaporization of the fuel. Thus, the execution of the first compression-stroke injection F2 increases a temperature difference between the temperature of a radially-outward part of the cavity 40 and the temperature of a center part in the combustion chamber 6 to securely avoid that the mixture gas in the radially-outward part of the cavity 40 and the mixture gas in the center part in the combustion chamber 6 start combustion simultaneously. Therefore, the rapid rise in the in-cylinder pressure inside the combustion chamber 6 and the increase in combustion noise are securely prevented.

As described above, in the first range A1, by carrying out the intake-stroke injection F1 and the first compression-stroke injection F2, it is thought that both the increase in soot and the increase in combustion noise can be prevented.

However, when the combustion chamber 6 is in a state where the mixture gas is difficult to combust inside the combustion chamber 6, the mixture gas may not properly self-ignite when only the intake-stroke injection F1 and the first compression-stroke injection F2 are performed. In detail, as described above, the temperature of the center part of the combustion chamber 6 (i.e., the temperature inside the cavity 40) is higher than the temperature of the radially-outward part. Thus, inside the combustion chamber 6, the mixture gas inside the cavity 40 first starts combustion, and mixture gas at the radially-outward side then combusts. However, as described above, since the first compression-stroke injection F2 is to inject fuel to the radially-outward part of the cavity 40, the concentration of fuel inside the cavity 40 can be kept low. Therefore, since the combustion of the mixture gas inside the cavity 40 becomes slower under the atmosphere in which the mixture gas is difficult to combust, the combustion in the entire combustion chamber 6 becomes also slower, that is, a combustion center-of-gravity timing is retarded from a desired timing, thereby reducing the engine torque below a desired torque.

Thus, in this embodiment, when the combustion chamber 6 is in the state where the mixture gas is difficult to combust inside the combustion chamber 6 and the combustion center-of-gravity timing is estimated to be retarded from the desired timing in the first range A1, the second compression-stroke injection F3 described above is carried out. By carrying out the second compression-stroke injection F3, the fuel concentration inside the cavity 40 is increased to stimulate the combustion of the mixture gas, and therefore, the combustion center-of-gravity timing is advanced. Here, the term "combustion center-of-gravity timing" as used herein refers to a timing at which a generation of 50% of the total amount of heat release to be generated inside the combustion chamber 6 in one combustion cycle is finished.

Further, in this embodiment, the operation timing of the first compression-stroke injection F2 is adjusted so that the combustion center-of-gravity timing occurs at the desired timing even when the second compression-stroke injection F3 is suspended. Moreover, when both the first compression-stroke injection F2 and the second compression-stroke injection F3 are carried out, the operation timings of the first compression-stroke injection F2 and the second compression-stroke injection F3, and ratios of a first compression-stroke injection amount Q2 which is an amount of fuel injected by the first compression-stroke injection F2 and a second compression-stroke injection amount Q3 which is an amount of fuel injected by the second compression-stroke injection F3 are adjusted so that the combustion center-of-gravity timing occurs at the desired timing.

Figure 7:
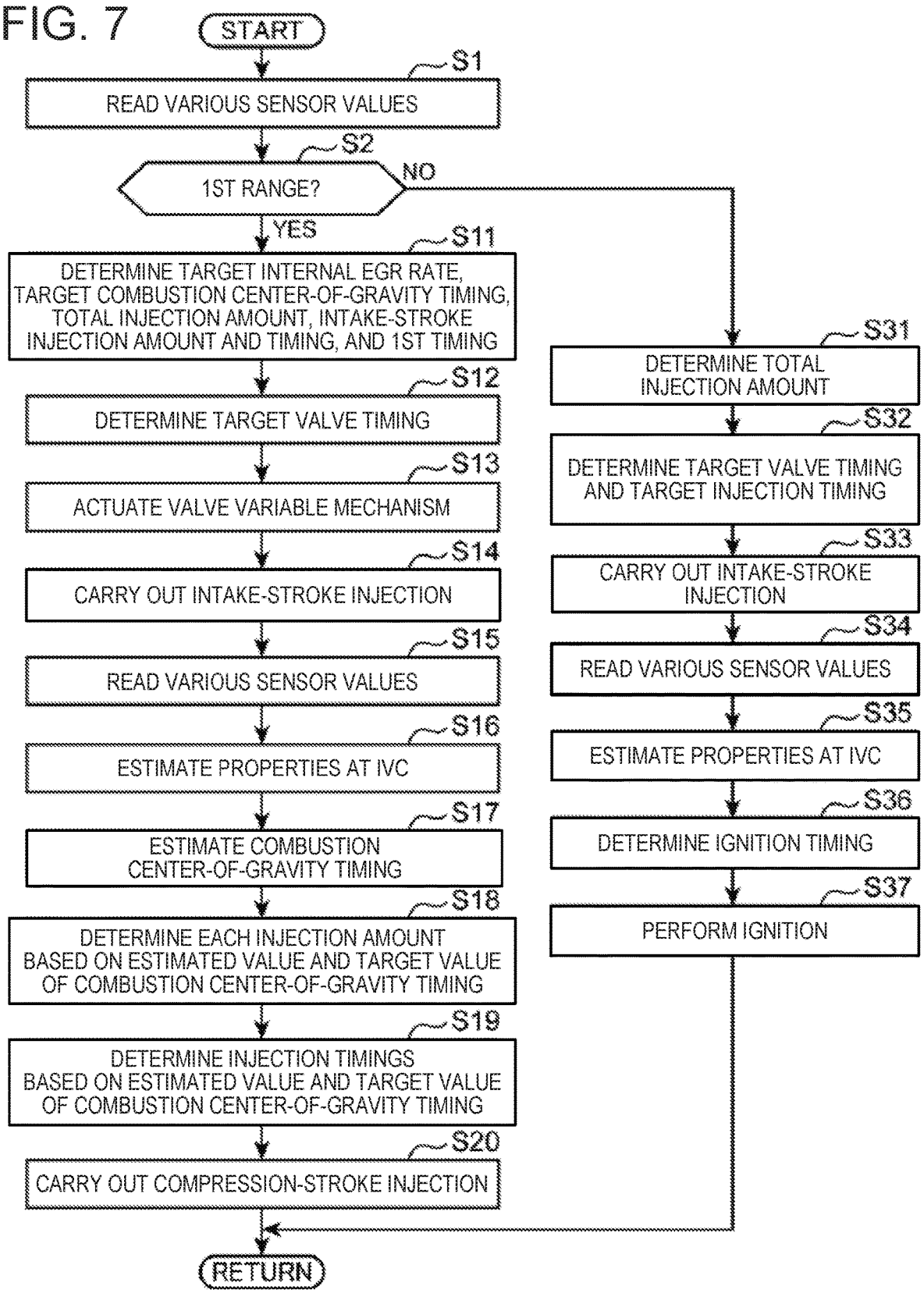
FIG. 7 is a flowchart illustrating a control procedure of the engine.

FIG. 7 is a flowchart illustrating a part of a control procedure executed by the ECU 100. An adjustment control of the operation timings of the compression-stroke injections F2 and F3, and the ratio of the injection amounts is described with reference to FIG. 7.

At Step S1, the ECU 100 reads the detected values from the various sensors. For example, the ECU 100 reads the engine speed, the engine water temperature, the intake air amount, the intake air temperature, the intake pressure, and the accelerator opening which are detected by the sensors SN1 to SN6.

Next, at Step S2, the ECU 100 determines whether the engine is operated at an operating point in the first range A1. In detail, the ECU 100 calculates the engine load based on the accelerator opening and the engine speed, and determines whether the current operating point of the engine is included in the first range A1 based on the calculated engine load and the engine speed.

If the determination at Step S2 is YES, and when the engine is operated at an operating point in the first range A1, the ECU 100 shifts to Step S11.

At Step S11, the ECU 100 determines a target internal EGR rate, a target combustion center-of-gravity timing, a total injection amount, an intake-stroke injection amount, an intake-stroke injection timing t_F1, and a reference first timing t_F2.

The target internal EGR rate is a target value of the internal EGR rate which is a ratio of an amount (weight) of internal EGR gas (burnt gas which remains inside the combustion chamber 6 by the execution of internal EGR) to the total gas amount (weight) inside the combustion chamber 6. The target combustion center-of-gravity timing is a target value of the combustion center-of-gravity timing.

The target internal EGR rate and the target combustion center-of-gravity timing are set in advance for every engine operating point and are stored in the ECU 100, and the ECU 100 extracts the target internal EGR rate and the target combustion center-of-gravity timing corresponding to the current operating point of the engine. For example, the target internal EGR rate, the combustion center-of-gravity, and the intake-stroke injection amount are set in advance corresponding to the engine speed and the engine load and are stored in the ECU 100 in the form of a map, and the ECU 100 extracts values corresponding to the current engine speed and the engine load from each map.

The total injection amount is the total amount of fuel injected into the combustion chamber 6 in one combustion cycle. The intake-stroke injection amount is an amount of fuel injected into the combustion chamber 6 by the intake-stroke injection F1. The intake-stroke injection timing t_F1 is an operation timing (start timing) of the intake-stroke injection F1.

The total injection amount, the intake-stroke injection amount, and the intake-stroke injection timing t_F1 are set in advance for every engine operating point and are stored in the ECU 100, and the ECU 100 extracts each value corresponding to the current operating point of the engine. For example, the total injection amount, the intake-stroke injection amount, and the intake-stroke injection timing t_F1 are set in advance corresponding to the engine speed and the engine load and are stored in the ECU 100 in the form of a map, and the ECU 100 extracts values corresponding to the current engine speed and the engine load from each map.

The reference first timing t_F2 is a reference value of the first timing t_F2. The reference first timing t_F2 is set in advance at a timing at which, while the state inside the combustion chamber 6 is a reference state, the target combustion center-of-gravity timing is achieved when the second compression-stroke injection F3 is suspended and the intake-stroke injection F1 and the first compression-stroke injection F2 are carried out. Note that the term "reference state" as used herein refers to, for example, a state where the steady operation of the engine is carried out and the temperature, the pressure, and the gas composition inside the combustion chamber 6 are a target temperature, a target pressure, and a target gas composition (most suitable for fuel efficiency, combustion noise, and exhaust performance).

Next, at Step S12, the ECU 100 determines a target valve timing. The target valve timing includes target values of the open timings and the close timings of the intake valve 11 and the exhaust valve 12. The ECU 100 calculates the target valve timing at which the target internal EGR rate can be achieved based on the target internal EGR rate determined at Step S11, the intake air amount, the intake pressure, etc.

Next, at Step S13, the ECU 100 issues commands to the intake-valve variable mechanism 15 and the exhaust-valve variable mechanism 16 so that the intake valve 11 and the exhaust valve 12 open and close at the target valve timing determined at Step S12.

Next, at Step S14, the ECU 100 carries out the intake-stroke injection F1. In detail, the ECU 100 actuates the injector 21 so that the fuel injection from the injector 21 is started at the intake-stroke injection timing t_F1 determined at Step S11 and the amount of fuel injected at this time becomes the intake-stroke injection amount determined at Step S11.

Next, at Step S15, the ECU 100 reads the detected values of the various sensors at the close timing of the intake valve 11 (IVC). That is, Steps S1, S2, and S11 to S14 are performed in a given combustion cycle, before the close timing of the intake valve 11 (IVC), and further, before the open timing of the exhaust valve 12 (EVO), and Step S14 is performed in the same combustion cycle at or after the close timing of the intake valve 11 (IVC).

Next, at Step S16, the ECU 100 estimates properties inside the combustion chamber 6 at the close timing of the intake valve 11 (IVC) based on the detected values of the various sensors read at Step S15. In detail, the ECU 100 estimates the intake air amount and the internal EGR rate inside the combustion chamber 6 at the close timing of the intake valve 11 (IVC). For example, the ECU 100 estimates an exhaust pressure which is a pressure inside the exhaust port 10 based on the engine speed, the engine load, the intake air amount, the intake pressure, and the open timings and the close timings of the intake valve 11 and the exhaust valve 12, and estimates the intake air amount inside the combustion chamber 6 and the internal EGR rate based on a pressure difference between the estimated exhaust pressure and the intake pressure, the intake air amount, the intake air temperature, and the engine speed. Then, the ECU 100 estimates the temperature inside the combustion chamber 6 at the close timing of the intake valve 11 (IVC) based on the estimated intake air amount and internal EGR rate, the intake air temperature, the engine load, and the engine water temperature. For example, the ECU 100 estimates the temperature inside the combustion chamber 6 so that the temperature becomes higher at the close timing of the intake valve 11 (IVC) when the high internal EGR rate is higher, the intake air temperature is higher, and the intake air amount is smaller, the engine load is higher, or the engine water temperature is higher. Moreover, the ECU 100 estimates the pressure inside the combustion chamber 6 at the close timing of the intake valve 11 (IVC). Below, the temperature inside the combustion chamber 6 at the close timing of the intake valve 11 (IVC) is referred to as an "IVC in-cylinder temperature," and the estimated IVC in-cylinder temperature is referred to as an "IVC estimated in-cylinder temperature."

Figure 8:
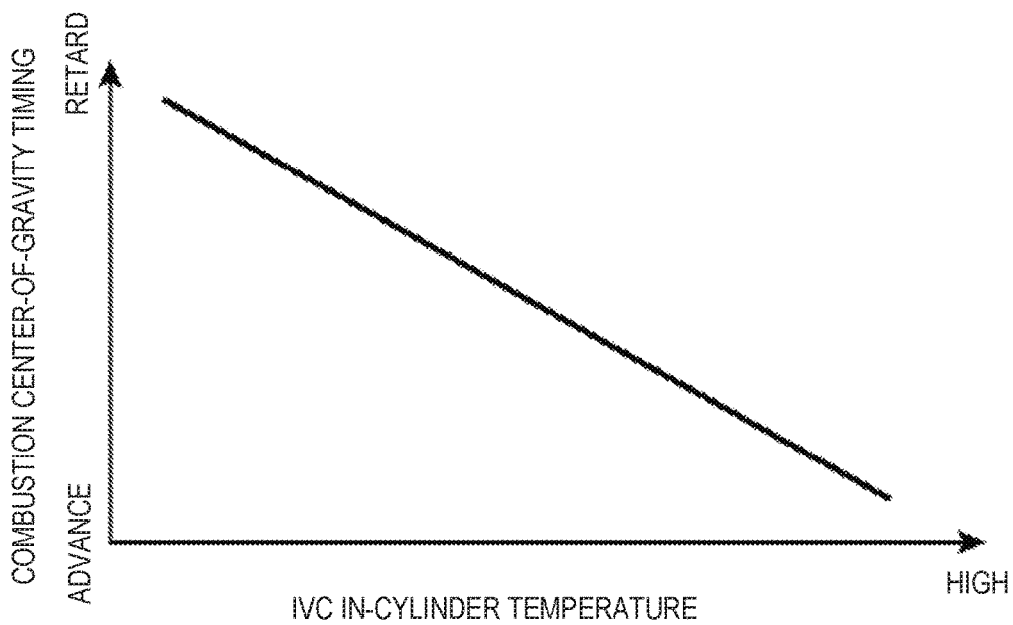
FIG. 8 is a graph illustrating a relationship between an IVC in-cylinder temperature and a combustion center-of-gravity timing.

Next, at Step S17, the ECU 100 estimates the combustion center-of-gravity timing achieved if the second compression-stroke injection F3 is suspended and the first compression-stroke injection F2 is carried out at the reference first timing based on the values estimated at Step S16 and the detected values of the various sensors read at Step S15. Below, the estimated combustion center of gravity is referred to as an "estimated combustion center-of-gravity timing." In this embodiment, a model formula for calculating the combustion center of gravity is incorporated into the ECU 100, and the ECU 100 calculates the combustion center of gravity by applying the estimated values and the detected values to the model formula. Here, as described above, the combustion center-of-gravity timing is retarded as the state inside the combustion chamber 6 is a state where the mixture gas is more difficult to combust, and, on the other hand, the combustion center-of-gravity timing is advanced as the state inside the combustion chamber 6 is a state where the mixture gas combusts more easily. The mixture gas is easier to combust as the IVC in-cylinder temperature increases. Thus, as illustrated in FIG. 8, the combustion center-of-gravity timing is advanced as the IVC in-cylinder temperature increases. Corresponding to this, the ECU 100 estimates the estimated combustion center-of-gravity timing so that, when the engine is operated at the same operating point, the estimated combustion center-of-gravity timing is advanced as the IVC estimated in-cylinder temperature increases.

Next, at Step S18, the ECU 100 determines the first compression-stroke injection amount Q2, and the second compression-stroke injection amount Q3 based on the estimated value and the target value of the combustion center-of-gravity timing, i.e., the estimated combustion center-of-gravity timing calculated at Step S17 and the target combustion center-of-gravity timing read at Step S11. Below, the sum of the first compression-stroke injection amount Q2 and the second compression-stroke injection amount Q3 is referred to as a "compression-stroke injection amount."

The ECU 100 first determines ratios of the first compression-stroke injection amount Q2 and the second compression-stroke injection amount Q3. In detail, the ECU 100 determines a ratio of the first compression-stroke injection amount Q2 to the compression-stroke injection amount, and a ratio of the second compression-stroke injection amount Q3 to the compression-stroke injection amount. Next, the ECU 100 calculates a value obtained by subtracting the intake-stroke injection amount determined at Step S11 from the total injection amount determined also at Step S11, as a compression-stroke injection amount. Then, the ECU 100 determines the injection amounts Q2 and Q3 based on the calculated compression-stroke injection amount, and the determined ratios of the injection amounts Q2 and Q3 corresponding to the compression-stroke injection amount.

Figure 9:
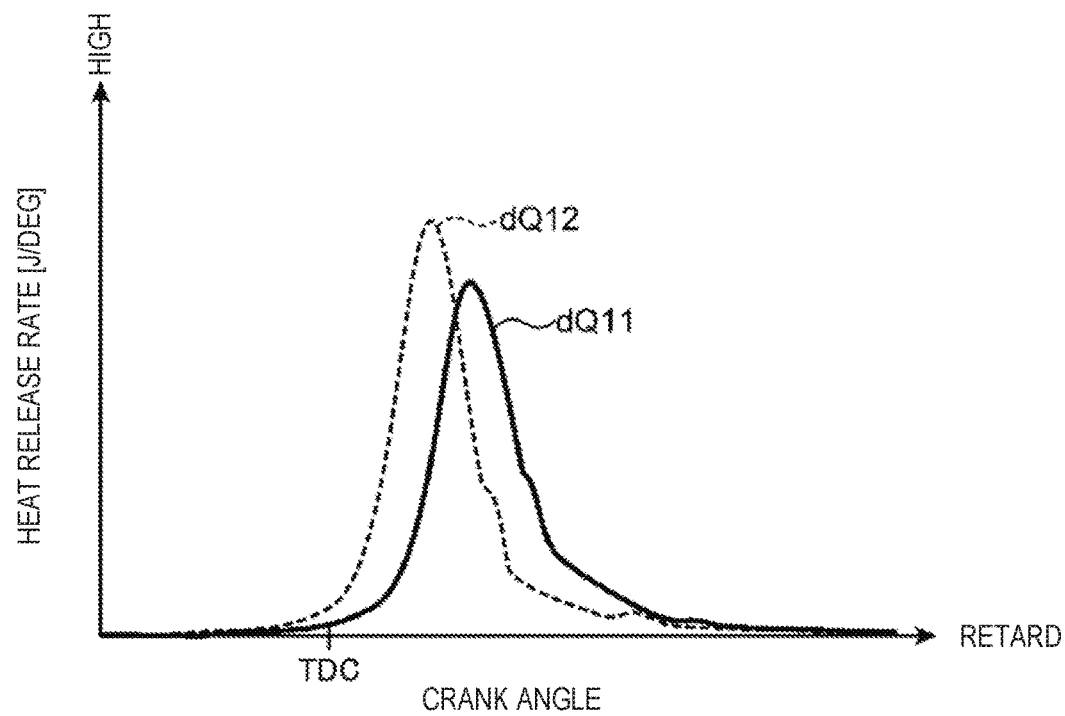
FIG. 9 is a graph illustrating a comparison of a heat release rate under conditions of different ratios of a second injection amount and a compression-stroke injection amount.

FIG. 9 is a graph illustrating a comparison of the heat release rate under conditions of different ratios of the second compression-stroke injection amount Q3 to the compression-stroke injection amount. The ratio of the second compression-stroke injection amount Q3 to the compression-stroke injection amount when a broken-line waveform dQ12 in FIG. 9 is obtained becomes larger than the same ratio when a solid-line waveform dQ11 is obtained, and as clear from the waveform comparison, the combustion center-of-gravity timing is advanced as the ratio of the second compression-stroke injection amount Q3 to the compression-stroke injection amount increases. This is because, when the second compression-stroke injection amount Q3 increases, the mixture gas inside the cavity 40 becomes richer to further stimulate the combustion inside the cavity 40 near a compression top dead center.

Figure 10:
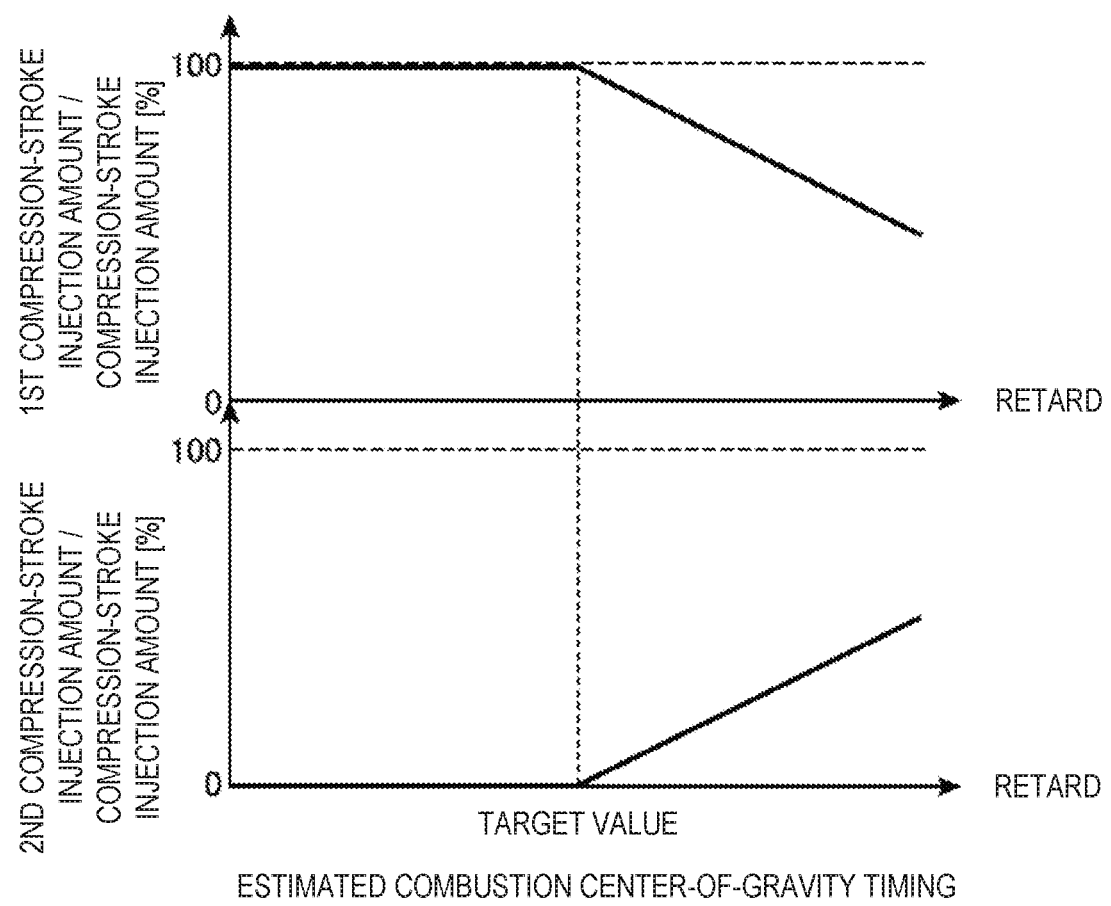
FIG. 10 is a graph illustrating a relationship between an estimated combustion center-of-gravity timing and ratios of the first injection amount and the second injection amount.

Corresponding to this, as illustrated in FIG. 10, the ECU 100 determines the ratio of the first compression-stroke injection amount Q2 to the compression-stroke injection amount (the ratio=Q2/the compression-stroke injection amount) and the ratio of the second compression-stroke injection amount Q3 to the compression-stroke injection (the ratio=Q3/the compression-stroke injection amount). Note that the ratio of the second compression-stroke injection amount Q3 to the compression-stroke injection amount is the same as a value obtained by subtracting the ratio of the first compression-stroke injection amount Q2 to the compression-stroke injection amount from 100%.

In detail, the ECU 100 lowers the ratio of the first compression-stroke injection amount Q2 to the compression-stroke injection amount (raises the ratio of the second compression-stroke injection amount Q3 to the compression-stroke injection amount) as the estimated combustion center-of-gravity timing is retarded. In detail, when the estimated combustion center-of-gravity timing is earlier than the target value (i.e., the target combustion center-of-gravity timing), the ECU 100 sets the ratio of the first compression-stroke injection amount Q2 to the compression-stroke injection amount to 100%, and sets the ratio of the second compression-stroke injection amount Q3 to the compression-stroke injection amount to 0%. Moreover, when the estimated combustion center-of-gravity timing is later than the target combustion center-of-gravity timing, the ECU 100 lowers the ratio of the first compression-stroke injection amount Q2 to the compression-stroke injection amount as a retarding amount of the estimated combustion center-of-gravity timing from the target combustion center-of-gravity timing increases. In the illustrated example, the ratio of the first compression-stroke injection amount Q2 to the compression-stroke injection amount is lowered by a certain ratio according to the retarding amount.

Returning to FIG. 7, the ECU 100 shifts to Step S19 after Step S18. At Step S19, the ECU 100 determines the first timing t_F2 and the second timing t_F3 based on the estimated combustion center-of-gravity timing calculated at Step S17 and the target combustion center-of-gravity timing read at Step S11. Note that the ECU 100 only determines the first timing t_F2 when the ratio of the second compression-stroke injection amount Q3 is determined as 0% at Step S18.

Figure 11:
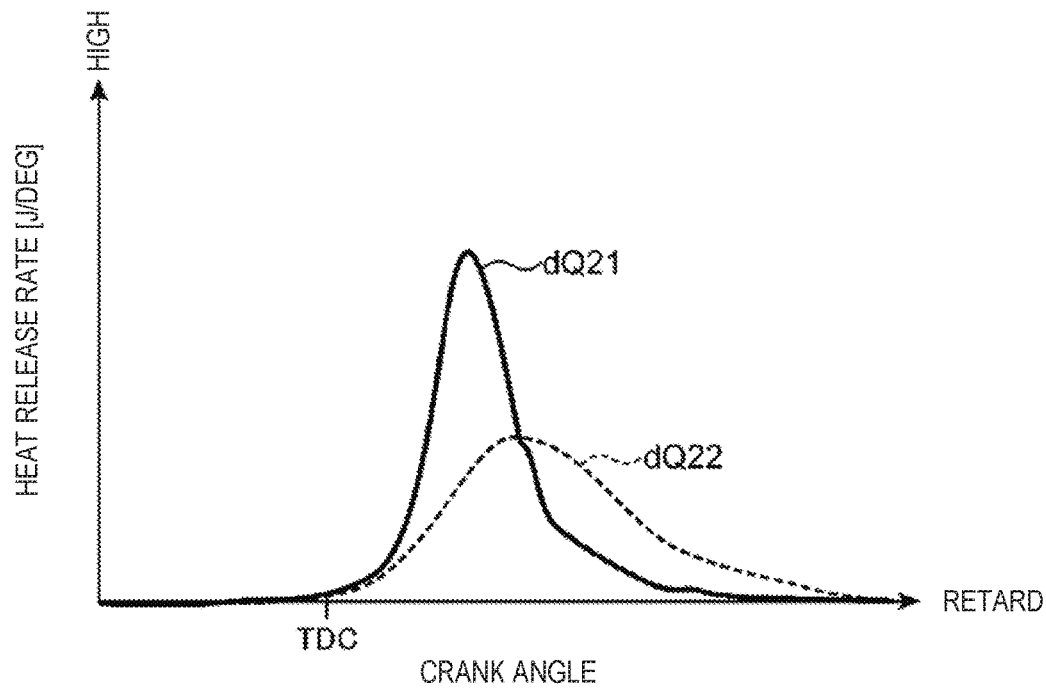
FIG. 11 is a graph illustrating a comparison of the heat release rate under conditions of different first timings.

FIG. 11 is a graph illustrating a comparison of the heat release rate under conditions of different first timings t_F2. The first timing t_F2 when the heat release rate has a solid-line waveform dQ21 in FIG. 11 is earlier (advance side) than the first timing t_F2 when the heat release rate has a broken-line waveform dQ22. As clear from the waveform comparison, the combustion center-of-gravity timing is retarded as the first timing t_F2 becomes later. This is because the temperature lowering effect at the radially-outward part of the combustion chamber 6 becomes larger near a compression top dead center when the first compression-stroke injection F2 is carried out at a later timing, which makes the combustion slower.

Figure 13:
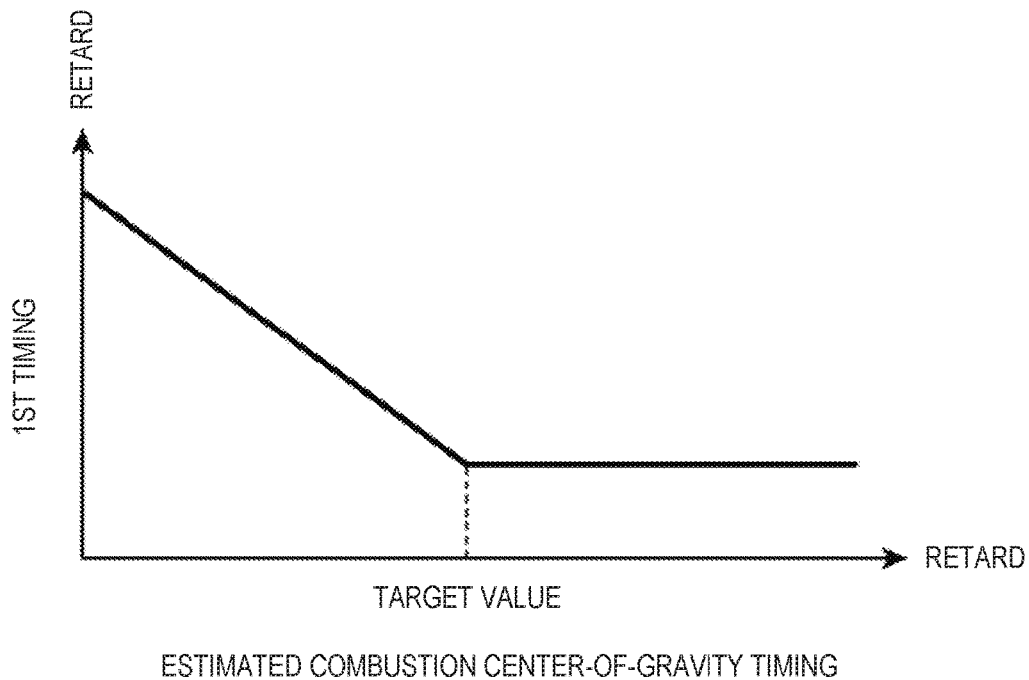
FIG. 13 is a graph illustrating a relationship between the estimated combustion center-of-gravity timing and the first timing.

Corresponding to this, the ECU 100 determines the first timing t F2 as illustrated in FIG. 13. In detail, the ECU 100 advances the first timing t_F2 as the estimated combustion center-of-gravity timing is retarded. In detail, when the estimated combustion center-of-gravity timing is earlier than the target combustion center-of-gravity timing (target value), the ECU 100 advances the first timing t_F2 as the estimated combustion center-of-gravity timing is retarded. In the example of FIG. 13, the first timing t_F2 is changed by a certain rate according to the difference between the estimated combustion center-of-gravity timing and the target combustion center-of-gravity timing. Moreover, when the estimated combustion center-of-gravity timing is later than the target combustion center of gravity timing, the ECU 100 maintains the first timing t_F2 at a certain value regardless of the change in the estimated combustion center-of-gravity timing, which is the reference first timing at which the target combustion center-of-gravity timing can be achieved. For example, the reference first timing t_F2 is set to 180° CA before a compression top dead center, and the first timing t_F2 is changed between 180° CA before the compression top dead center and 70° CA before the compression top dead center according to the estimated combustion center-of-gravity timing.

Figure 12:
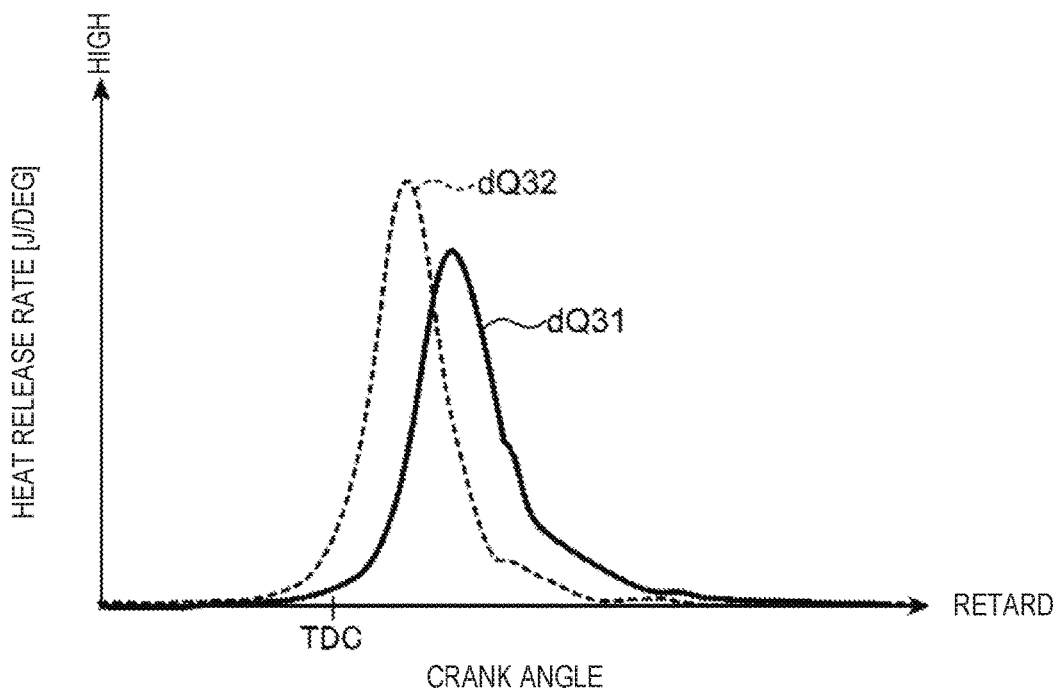
FIG. 12 is a graph illustrating a comparison of the heat release rate under conditions of different second timings.

FIG. 12 is a graph illustrating a comparison of the heat release rate under conditions of the different second timings t_F3. The second timing t_F3 when the heat release rate has a solid-line waveform dQ31 in FIG. 12 is earlier (advance side) than the second timing t_F3 when the heat release rate has a broken-line waveform dQ32. As clear from the waveform comparison, the combustion center-of-gravity timing is advanced as the second timing t_F3 becomes later, unlike the first timing t_F2. This is because diffusion of fuel inside the cavity 40 near the compression top dead center is suppressed when the second compression-stroke injection F3 is carried out at a later timing, which forms a richer mixture gas. Therefore, combustion of the mixture gas starts earlier, and the following combustion is also stimulated.

Figure 14:
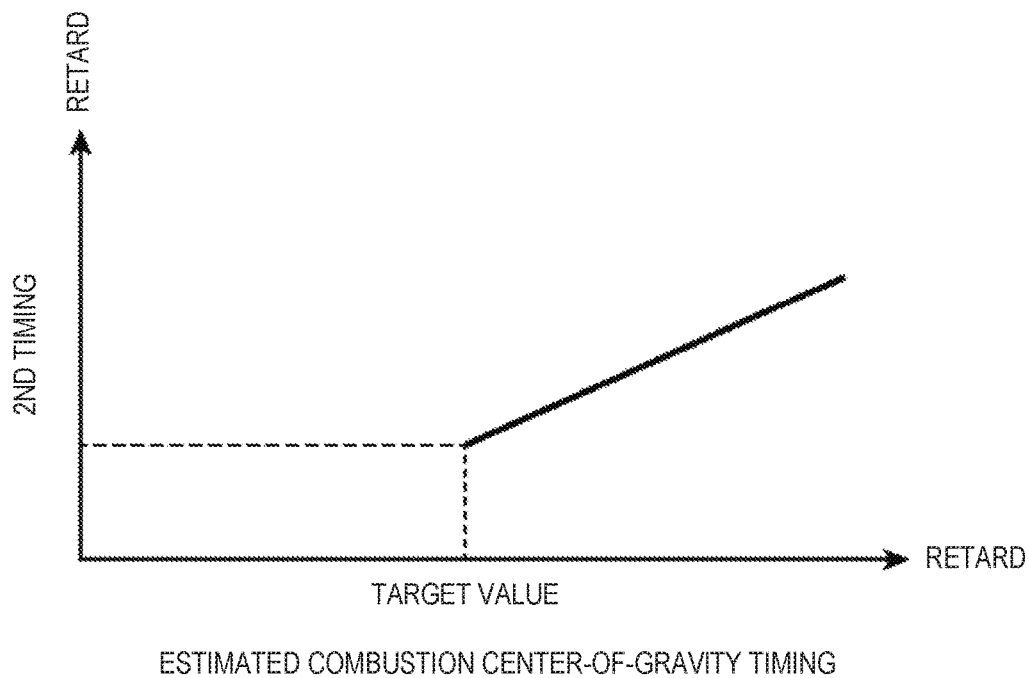
FIG. 14 is a graph illustrating a relationship between the estimated combustion center-of-gravity timing and the second timing.

Corresponding to this, the ECU 100 determines the second timing t_F3 as illustrated in FIG. 14. In detail, the ECU 100 retards the second timing t_F3 as the estimated combustion center-of-gravity timing becomes later (retard side). In detail, the ECU 100 retards the second timing t_F3 as the retarding amount of the estimated combustion center-of-gravity timing from the target combustion center-of-gravity timing (target value) becomes larger. In the example of FIG. 14, the second timing t_F3 is retarded by a certain rate according to the retarding amount.

Thus, when the estimated combustion center-of-gravity timing is at or advanced from the target combustion center-of-gravity timing, the ECU 100 suspends the second compression-stroke injection F3 and only carries out the first compression-stroke injection F2, and retards the first timing t_F2 as the advancing amount of the estimated combustion center-of-gravity timing from the target combustion center-of-gravity timing becomes larger. Moreover, when the estimated combustion center-of-gravity timing is at the retard side of the target combustion center of gravity, the ECU 100 carries out both the second compression-stroke injection F3 and the first compression-stroke injection F2, and retards the second timing t_F3 as the retarding amount of the estimated combustion center-of-gravity timing from the target combustion center-of-gravity timing becomes larger.

Returning to FIG. 7, the ECU 100 causes the injector 21 to carry out the compression-stroke injection at Step S20 which is executed after Step S19. In detail, the ECU 100 causes the injector 21 to carry out the first compression-stroke injection F2, and instructs the injector 21 so that the amount of fuel injected by the first compression-stroke injection F2 becomes the first compression-stroke injection amount Q2 determined at Step S18, and the operation timing of the first compression-stroke injection F2 becomes the first timing t_F2 determined at Step S19. Moreover, when the ratio of the second compression-stroke injection amount Q3 to the compression-stroke injection is determined as a value larger than 0% at Step S18, the ECU 100 causes the injector 21 to carry out the first compression-stroke injection F2 as described above, and causes the injector 21 to carry out the second compression-stroke injection F3. Then, the ECU 100 instructs the injector 21 so that the amount of fuel injected by the second compression-stroke injection F3 becomes the second compression-stroke injection amount Q3 determined at Step S18, and the operation timing of the second compression-stroke injection F3 becomes the second timing t_F3 determined at Step S19. After Step S20, the ECU 100 ends this processing (returns to Step S1).

(2-2) Second Range

The content of the control executed by the ECU 100 in the second range A2 is described. In the second range A2, SI (Spark Ignition) combustion in which the mixture gas is forcibly combusted by jump-spark ignition inside the combustion chamber 6 is performed. That is, the mixture gas is combusted by ignition energy from the ignition plug 20. Thus, the ignition plug 20 is activated in the second range A2.

A control executed by the ECU 100 in the second range A2 is described with reference to the flowchart of FIG. 7.

As described above, at Step S2, the ECU 100 determines whether the engine is operated at an operating point in the first range A1. If this determination is NO, and when the engine is operated at an operating point in the second range A2, the ECU 100 carries out a control set for the second range A2 which starts from Step S31.

At Step S31, the ECU 100 first determines the total injection amount. Similar to the first range A1, also in the second range A2, the total injection amount is set in advance for every engine operating point and is stored in the ECU 100, and the ECU 100 extracts the value corresponding to the current operating point of the engine.

Next, the ECU 100 determines a target valve timing at Step S32. Moreover, the ECU 100 determines a target fuel injection timing. In the second range A2, all the fuel (all the amount of fuel supplied to the combustion chamber 6 in one combustion cycle) is injected from the injector 21 at a time at a given timing in an intake stroke. The target fuel injection timing determined at Step S32 is a target value of the operation timing (start timing) of the fuel injection carried out in the intake stroke. The target valve timing and the target fuel injection timing are set in advance for every engine operating point and are stored in the ECU 100, and the ECU 100 extracts the values corresponding to the current operating point of the engine. Note that the fuel injection pattern in the second range A2 is not limited to this configuration, and a main part of the fuel may be injected in an intake stroke and the remaining fuel may be injected at a later timing, such as a timing near the compression top dead center.

At Step S33, the ECU 100 carries out the intake-stroke injection. In detail, the ECU 100 actuates the injector 21 so that the fuel injection is started at the target fuel injection timing determined at Step S32, which is the given timing in the intake stroke, and the amount of fuel injected from the injector 21 at this time becomes the total injection amount determined at Step S31.

Next, at Step S34, the ECU 100 reads the detected values of the various sensors at the close timing of the intake valve 11 (IVC) similar to Step S15.

Next, at Step S35, the ECU 100 estimates the property inside the combustion chamber 6 at the close timing of the intake valve 11 (IVC) similar to Step S16. In detail, the ECU 100 estimates the temperature inside the combustion chamber 6 at the close timing of the intake valve 11 (IVC) similar to Step S16.

Next, at Step S36, the ECU 100 determines the ignition timing (the timing at which the ignition plug 20 ignites) based on the temperature inside the combustion chamber 6 at the close timing of the intake valve 11 (IVC) estimated at Step S35.

Next, at Step S37, the ECU 100 instructs the ignition plug 20 to perform an ignition at the ignition timing determined at Step S36.

Note that in the first range A1, the throttle valve 25 is maintained substantially at the fully open. On the other hand, in the second range A2, the opening of the throttle valve 25 is changed so that the target value of the intake air amount set in advance for each operating point is achieved.

(3) Operation and Effects

As described above, in this embodiment, when the estimated combustion center-of-gravity timing may become later than the target combustion center-of-gravity timing in the first range A1 during which CI combustion is performed, and the combustion may become slow, the second compression-stroke injection F3 is carried out in addition to the intake-stroke injection F1 and the first compression-stroke injection F2 so that a part of the fuel is injected toward the cavity 40. Therefore, the fuel concentration inside the cavity 40 is increased to stimulate the combustion of the mixture gas inside the cavity 40 (as a result, the mixture gas inside the entire combustion chamber 6), thereby preventing the combustion becoming excessively slow. That is, the proper compression self-ignition combustion can be achieved. Moreover, in the first range A1, when the estimated combustion center-of-gravity timing is at or earlier than the target combustion center-of-gravity timing so that the combustion will not become slow, the second compression-stroke injection F3 is suspended. Therefore, the combustion can be prevented from becoming excessively stimulated by the execution of the second compression-stroke injection F3, i.e., the increase in combustion noise can be prevented. Moreover, when the estimated combustion center-of-gravity timing may be earlier than the target combustion center-of-gravity timing to make the combustion too abrupt, the increase in combustion noise can be prevented by supplying the fuel to the radially-outward part of the combustion chamber 6 by the execution of the first compression-stroke injection F2 and effectively cooling the radially-outward part.

Here, as described above, the estimated combustion center-of-gravity timing is calculated so as to become an earlier timing as the IVC in-cylinder temperature increases. Thus, in the embodiment, when the IVC in-cylinder temperature is lower than the temperature at which the target combustion center-of-gravity timing can be achieved, the second compression-stroke injection F3 is carried out in addition to the first compression-stroke injection F2, and when the IVC in-cylinder temperature is equal to or higher than the temperature at which the target combustion center-of-gravity timing can be achieved, the first compression-stroke injection F2 is carried out and the second compression-stroke injection F3 is suspended. The phrase "when the IVC in-cylinder temperature is lower than the temperature at which the target combustion center-of-gravity timing can be achieved" as used herein is an example of "when the engine is operated by CI combustion under a given first condition" in the present disclosure, and "when the IVC in-cylinder temperature is equal to or higher than the temperature at which the target combustion center-of-gravity timing can be achieved" is an example of "when the engine is operated by CI combustion under a second condition in which the temperature inside the combustion chamber at the close timing of the intake valve becomes lower than the temperature under the first condition" in the present disclosure.

Moreover, in this embodiment, the IVC in-cylinder temperature is estimated, and according to the estimated combustion center-of-gravity timing which is estimated based on the estimated IVC in-cylinder temperature (IVC estimated in-cylinder temperature), the ratios of the first compression-stroke injection amount Q2 and the second compression-stroke injection amount Q3 are changed. Therefore, the first compression-stroke injection amount Q2 and the second compression-stroke injection amount Q3 can be adjusted to suitable amounts according to the IVC in-cylinder temperature.

In particular, in this embodiment, the ratio of the first compression-stroke injection amount Q2 to the compression-stroke injection amount is reduced and the ratio of the second compression-stroke injection amount Q3 to the compression-stroke injection amount is increased, as the estimated combustion center-of-gravity timing is later. In addition, the first timing t_F2 is advanced as the estimated combustion center-of-gravity timing is later. Moreover, the second timing t_F3 is retarded as the estimated combustion center-of-gravity timing is later. Therefore, the combustion center-of-gravity timing can be securely brought closer to the target combustion center-of-gravity timing, and the proper compression self-ignition combustion can be carried out more securely.

Moreover, in the embodiment, the intake-stroke injection is carried out in the first range A1 to inject a part of the fuel from the injector 21 in the intake stroke. Therefore, mixing of a portion of the fuel with air can be stimulated to prevent the increase in soot more securely.

(4) Modification

In the above embodiment, in the first range A1, after the combustion center-of-gravity timing is estimated based on the estimated IVC in-cylinder temperature (IVC estimated in-cylinder temperature), the ratios of the first compression-stroke injection amount Q2 and the second compression-stroke injection amount Q3, and the execution timings for these injections (first timing t_F2 and second timing t_F3) are determined according to the estimated combustion center-of-gravity timing. The ratios and the timings may be determined based on the IVC estimated in-cylinder temperature, without estimating the combustion center-of-gravity timing. In this case, since the combustion center-of-gravity timing becomes later as the IVC in-cylinder temperature decreases as described above, the ratio of the first compression-stroke injection amount Q2 to the compression-stroke injection amount is reduced (the ratio of the second compression-stroke injection amount Q3 to the compression-stroke injection amount is increased) as the IVC estimated in-cylinder temperature decreases. Moreover, the first timing t_F2 is made earlier (advanced) as the IVC estimated in-cylinder temperature decreases. Moreover, the second timing t_F3 is made later (retarded) as the IVC estimated in-cylinder temperature decreases.

Although in the above embodiment the intake-stroke injection is carried out in the first range A1, the intake-stroke injection may not be carried out in the first range A1.

Moreover, although in the above embodiment the second compression-stroke injection F3 is carried out together with the first compression-stroke injection F2 when carrying out the second compression-stroke injection F3 in the first range A1, the first compression-stroke injection F2 may be suspended when carrying out the second compression-stroke injection F3 (in the above embodiment, when the estimated combustion center-of-gravity timing is later than the target combustion center-of-gravity timing).

Moreover, although in the above embodiment the IVC in-cylinder temperature is estimated based on the internal EGR rate, the intake air temperature, the intake air amount, the engine load, and the engine water temperature, an in-cylinder pressure sensor which is configured to measure the in-cylinder pressure which is the pressure inside the combustion chamber 6 may be provided, and the IVC in-cylinder temperature may be estimated based on the detected value of the in-cylinder pressure sensor, in addition to or instead of the parameters described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

5 Piston
6 Combustion Chamber
9 Intake Port
11 Intake Valve
21 Injector (Fuel Injection System)
40 Cavity
100 ECU (Control Device, Injection Controller)
F1 Intake-stroke Injection
F2 First Compression-stroke Injection (First Injection)
F3 Second Compression-stroke Injection (Second Injection)

What is claimed is:

1. A control device for a compression self-ignition engine including a cylinder, a piston fitted in the cylinder and having a concave cavity formed in a crown surface thereof, and an intake valve configured to open and close an intake port configured to introduce intake air into a combustion chamber defined by the cylinder and the piston, the engine being configured to execute compression self-ignition (CI) combustion in which a mixture gas of fuel and air combusts inside the combustion chamber by self-ignition, the control device comprising:
a fuel injection system configured to inject fuel from a ceiling surface of the combustion chamber into the combustion chamber; and
an injection controller configured to cause the fuel injection system to carry out a first injection to inject fuel at a first timing in a compression stroke, and a second injection to inject fuel at a second timing later than the first timing in the compression stroke, while executing the CI combustion,
wherein the first timing is set at a timing when the fuel injected from the fuel injection system goes toward a part radially outward of the cavity, and the second timing is set at a timing when the fuel injected from the fuel injection system goes toward the cavity,
wherein, while the engine is operated by the CI combustion under a given first condition, the injection controller causes the fuel injection system to carry out the first injection and suspend the second injection, and
wherein, while the engine is operated by the CI combustion under a second condition in which a temperature inside the combustion chamber at a close timing of the intake valve becomes lower than the temperature under the first condition, the injection controller causes the fuel injection system to carry out at least the second injection.

2. The control device of claim 1, wherein, while the CI combustion is performed, the injection controller estimates the temperature inside the combustion chamber at the close timing of the intake valve, and determines a ratio of a first injection amount that is an amount of fuel injected at the first timing and a ratio of a second injection amount that is an amount of fuel injected at the second timing based on an intake valve close timing (IVC) estimated in-cylinder temperature that is the estimated temperature inside the combustion chamber.

3. The control device of claim 2, wherein, while the CI combustion is performed, the injection controller determines the first timing and the second timing based on the IVC estimated in-cylinder temperature.

4. The control device of claim 3,
wherein, while the CI combustion is performed, the injection controller estimates a combustion center-of-gravity timing based on the IVC estimated in-cylinder temperature so that the combustion center-of-gravity timing becomes earlier as the IVC estimated in-cylinder temperature increases,
wherein the injection controller determines the first injection amount and the second injection amount so that the ratio of the second injection amount to the sum of the first injection amount and the second injection amount becomes larger as the estimated combustion center-of-gravity timing is later, and
wherein the injection controller determines the first timing so that the first timing becomes earlier as the estimated combustion center-of-gravity timing is later, and determines the second timing so that the second timing becomes later as the estimated combustion center-of-gravity timing is later.

5. The control device of claim 4, wherein, while the CI combustion is performed, the injection controller causes the fuel injection system to carry out an intake-stroke injection to inject fuel in an intake stroke.

6. The control device of claim 1, wherein, while the CI combustion is performed, the injection controller causes the fuel injection system to carry out an intake-stroke injection to inject fuel in an intake stroke.

7. The control device of claim 2,
wherein, while the CI combustion is performed, the injection controller estimates a combustion center-of-gravity timing based on the IVC estimated in-cylinder temperature so that the combustion center-of-gravity timing becomes earlier as the IVC estimated in-cylinder temperature increases,
wherein the injection controller determines the first injection amount and the second injection amount so that the ratio of the second injection amount to the sum of the first injection amount and the second injection amount becomes larger as the estimated combustion center-of-gravity timing is later, and
wherein the injection controller determines the first timing so that the first timing becomes earlier as the estimated combustion center-of-gravity timing is later, and determines the second timing so that the second timing becomes later as the estimated combustion center-of-gravity timing is later.

8. The control device of claim 2, wherein, while the CI combustion is performed, the injection controller causes the fuel injection system to carry out an intake-stroke injection to inject fuel in an intake stroke.

9. The control device of claim 3, wherein, while the CI combustion is performed, the injection controller causes the fuel injection system to carry out an intake-stroke injection to inject fuel in an intake stroke.

10. The control device of claim 7, wherein, while the CI combustion is performed, the injection controller causes the fuel injection system to carry out an intake-stroke injection to inject fuel in an intake stroke.

* * * * *